United States Patent Office 3,642,673
Patented Feb. 15, 1972

3,642,673
NON-COLD-FLOWABLE UNSATURATED POLY-
ESTER RESIN COMPOSITION
Wilhelm Muhleisen, 8264 Waldkraiburg,
3 Munchner Platz, Germany
Claims priority, application Germany, May 16, 1968,
P 17 69 309.3
Int. Cl. C08g 17/06
U.S. Cl. 260—22 CB                              4 Claims

ABSTRACT OF THE DISCLOSURE

A composition of matter comprising 100 parts by weight of a linear unsaturated polyester dissolved in a mono-olefinic vinyl monomer copolymerizable therewith; 0.04 to 0.2 part by weight thereof of a first peroxide of low-temperature type; 0.2 to 0.6 parts by weight thereof of a cobalt accelerator; 0.15 to 0.6 part by weight thereof of a second peroxide, a hydroperoxide of low-temperature type; 0.3 to 0.7 part by weight thereof of a third peroxide of high-temperature type, 0.05 to 0.3 part by weight thereof of an alkaline earth oxide; and 0.1 to 1.5 parts by weight thereof of water.

BACKGROUND OF THE INVENTION (1) Field of the invention

The instant invention relates to a prepolymerized unsaturated polyester resin composition which can be processed to make clear, transparent molded articles.

(2) Description of the prior art

It is known in the art that the unsaturated polyester resins can only be pressed or molded in the presence of fillers or filler materials which prevent or inhibit the cold-flow of the mass undergoing processing.

Moreover, in many areas of application, particularly in the manufacture of buttons and like shaped articles, a need exists for a method which is capable of affording clear, transparent molded articles comprised of the unsaturated polyester resins.

SUMMARY OF THE INVENTION

Therefore, a primary object of the invention is that of providing polyester materials which maintain their shapes indefinitely while in a state of prepolymerization and which no longer exhibit the phenomenon of cold-flow.

Briefly speaking, the invention features the addition, to 100 parts by weight of a linear, unsaturated polyester dissolved in a mono-olefinic vinyl monomer copolymerizable therewith, of 0.04 to 0.2 part by weight thereof of a first peroxide of the low-temperature type (18° C. to 35° C.), e.g., cyclohexanone peroxide; 0.2 to 0.6 part by weight thereof of a cobalt accelerator; 0.15 to 0.6 part by weight thereof of a second peroxide, a hydroperoxide of low-temperature type (60° C. to 80° C.); 0.3 to 0.7 part by weight thereof of a third peroxide of the high-temperature type (120° C. to 140° C.); 0.05 to 0.3 part by weight tehereof of an alkaline earth oxide; and 0.1 to 1.5 parts by weight thereof of water. This mixture is next thoroughly mixed and thence permitted to stand until the same has become gelatinized.

DESCRIPTION OF THE PREFERRED EMBODIMENTS

According to the invention there is employed the gradual decomposition or dissociation of various peroxides whose stages of decay are slowed down or inhibited in a desired range. Three peroxides having varying synergistic effects are employed. The first peroxide is of the cyclohexanone peroxide type and is employed in a quantity less than 5% of the conventional amount and which is stimulated by the cobalt accelerator and is completely consumed in the process. This launches the reaction of a second peroxide, a hydroperoxide (specifically, a perester with a low-temperature of decay). The decay of the second peroxide would normally trigger the third peroxide and, through free radicals, would also continue the polymerization at room temperatures. But this polymerization stage can be blocked by adding small quantities of water and an alkaline earth oxide. Hence, there is afforded a balance which provides a processing time in the order of about 120 hours.

For the accelerator there is preferably employed cobalt octoate or cobalt ethylhexoate, although cobalt in the form of its hexanoate or naphthenate salt is a good, general-purpose activator for use with the ketone peroxides; by peroxide of the low decay temperature type there is intended tertiary butylhydroperoxide.

As the peroxide of the high decay temperature type there is intended tertiary butylperbenzoate, dicumyl peroxide, tertiary butylperpivalate, tertiary butylperoctoate, di-tertiary butylperoxide, dichlorobenzoyl peroxide or tertiary butyl-cumyl-peroxide. Other and similar peroxides are within the ambit of the invention.

The various components can of course be formulated of several substances falling within the same group.

By linear unsaturated polyesters there are intended those polyesters formed by condensing the unsaturated dibasic acids with the saturated glycols and vice versa, and mixtures thereof. By vinyl monomers copolymerizable therewith, there are intended such monomers as vinyl acetate, styrene and methyl methacrylate. Suitable linear unsaturated polyesters may be prepared from, inter alia, the maleates and fumarates of ethylene glycol or propylene glycol, and other acids that may be employed comprise adipic, phthalic, or sebacic.

A suitable linear unsaturated polyester according to the invention may be prepared by the photopolymerization of two moles of maleic acid, 1 mole of adipic acid, 1 mole of phthalic acid, 3 moles of 1,3-dipropylene glycol, and 1 mole of 1,2-dipropylene glycol.

In order to further illustrate the present invention and the advantages thereof, the following specific example is given, it being understood that the same is merely intended to be illustrative and in no wise limitative.

EXAMPLE

To 100 parts by weight of a polyester matrix, 0.1 part by weight thereof of cyclohexanone peroxide, 0.3 part by weight thereof of cobalt octoate, 0.3 part by weight thereof of tertiary butylhydroperoxide, 0.5 part by weight thereof of dicumyl peroxide, 0.15 part by weight thereof of calcium oxide and 1 part by weight thereof of water were added and thoroughly admixed. The admixture was permitted to stand for a period of from 20 to 25 hours. The aforesaid produced a prepolymerization product wherein about 20 to 55% of the existing double bonds were polymerized. This state of equilibrium, which was suitable for the processing of the subject composition via pressing or molding, lasted for up to 120 hours. During this time no cold-flow was in evidence and the mass could be readily processed and thoroughly polymerized with ease. The polyester compositions can tolerate a temperature of up to about 180° C. and, in the processing of shaped articles roughly the size of buttons, there was required a complete polymerization time of only about 20 to 25 seconds and at a pressing temperature of about 165 to 170° C. The blanks which were produced in this matter were completely transparent.

The subject method is therefore particularly suited for the manufacture of buttons wherein the patterned or dyed masses are embedded in a transparent matrix.

It will be appreciated that a thickener such as erosyl (Degussa's anhydrous finely atomized silicic acid) can be added to render the mass thixotropic so that, when added to other masses, there is no diffusion of one into the other and thus there can be provided finely outlined patterns.

As many apparently widely different embodiments of this invention may be made without departing from the scope and spirit thereof, it is to be understood that the same is not to be limited to the specific embodiments thereof, except as claimed in the appended claims:

What is claimed is:

1. A composition of matter comprising 100 parts by weight of a linear unsaturated polyester dissolved in a monoolefinic vinyl monomer copolymerizable therewith; 0.04 to 0.2 part by weight thereof of a peroxide which initiates polymerization within the range of from 18° C. to 35° C.; 0.2 to 0.6 part by weight thereof of a cobalt accelerator; 0.15 to 0.6 part by weight thereof of a hydro-peroxide which initiates polymerization within the range of from 60° C. to 80° C.; 0.3 to 0.7 part by weight thereof of a peroxide which initiates polymerization within the range of from 120° C. to 140° C.; 0.05 to 0.3 part by weight thereof of an alkaline earth oxide; and 0.1 to 1.5 parts by weight thereof of water.

2. The composition of matter as defined by claim 1, wherein the cobalt accelerator is cobalt octoate.

3. A composition of matter as defined by claim 2, wherein the peroxide which initiates polymerization within the range of from 120° C. to 140° C. is selected from the group consisting of tertiary butylperbenzoate, dicumyl peroxide, tertiary butylperpivalate, tertiary butylperoctoate, di-tertiary butyl peroxide, dichlorobenzoyl peroxide and tertiary butyl-cumyl-peroxide.

4. The composition of matter as defined by claim 3, wherein the hydro-peroxide which initiates polymerization within the range of from 60° C. to 80° C. is tertiary butylhydroperoxide.

References Cited

UNITED STATES PATENTS

| | | | |
|---|---|---|---|
| 2,843,556 | 7/1958 | Moorman | 260—863 |
| 3,333,021 | 7/1967 | Geipert | 260—863 |
| 3,431,320 | 3/1969 | Baum et al. | 260—865 |
| 3,432,458 | 3/1969 | Kwan et al. | 260—863 |

FOREIGN PATENTS

| | | | |
|---|---|---|---|
| 239,280 | 6/1962 | Australia | 260—865 |
| 249,956 | 2/1964 | Australia | 260—865 |
| 1,017,050 | 1/1966 | Great Britain | 260—865 |

DONALD E. CZAJA, Primary Examiner

R. W. GRIFFIN, Assistant Examiner

U.S. Cl. X.R.

260—22 CA, 23 P, 863, 865